United States Patent
Stelzer

[15] 3,645,494
[45] Feb. 29, 1972

[54] VALVE FOR FLUID-ACTUATED BRAKE SYSTEM
[72] Inventor: William Stelzer, Milford, Mich.
[73] Assignee: Kelsey-Hayes Company, Romulus, Mich.
[22] Filed: Aug. 19, 1969
[21] Appl. No.: 851,417

[52] U.S. Cl. .............................. 251/121, 138/46, 303/10, 303/54
[51] Int. Cl. ........................................ F16k 47/04
[58] Field of Search ................ 251/120, 121, 333, 356, 357; 137/625.69; 138/46; 303/10, 54, 52

[56] References Cited

UNITED STATES PATENTS

| 485,984 | 11/1892 | Randall | 251/357 X |
|---|---|---|---|
| 2,260,381 | 10/1941 | Kennon | 251/357 X |
| 2,290,177 | 7/1942 | Grant | 251/333 |
| 3,196,891 | 7/1965 | Valentine | 303/54 X |
| 3,337,180 | 8/1967 | Carlton | 251/121 |
| 3,349,879 | 10/1967 | Stuart et al | 137/625.69 X |

FOREIGN PATENTS OR APPLICATIONS

| 520,187 | 2/1931 | Germany | 251/120 |
|---|---|---|---|
| 12,911 | 6/1904 | Great Britain | 251/356 |
| 657,075 | 9/1951 | Great Britain | 251/357 |

*Primary Examiner*—M. Cary Nelson
*Attorney*—Olsen and Stephenson

[57] ABSTRACT

An improved main valve for a fluid-actuated brake system incorporating skid control wherein an elongated passage is provided between an inlet chamber containing high-pressure fluid and an outlet chamber and a movable seal is provided in the inlet chamber for closing one end of the passage. A flanged retainer sleeve is capable of pulling the seal away from the passage when the chambers are to be communicated, and the closely spaced walls of the passage apply frictional forces to the fluid flowing therethrough so as to reduce the velocity of the fluid thereby reducing the problem of erosion and damage to the seal and the valve passage due to the flow of high-velocity fluid. The passage is configured so that the frictional forces applied to the fluid by the passage walls are progressively reduced in response to progressive opening of the valve.

9 Claims, 6 Drawing Figures

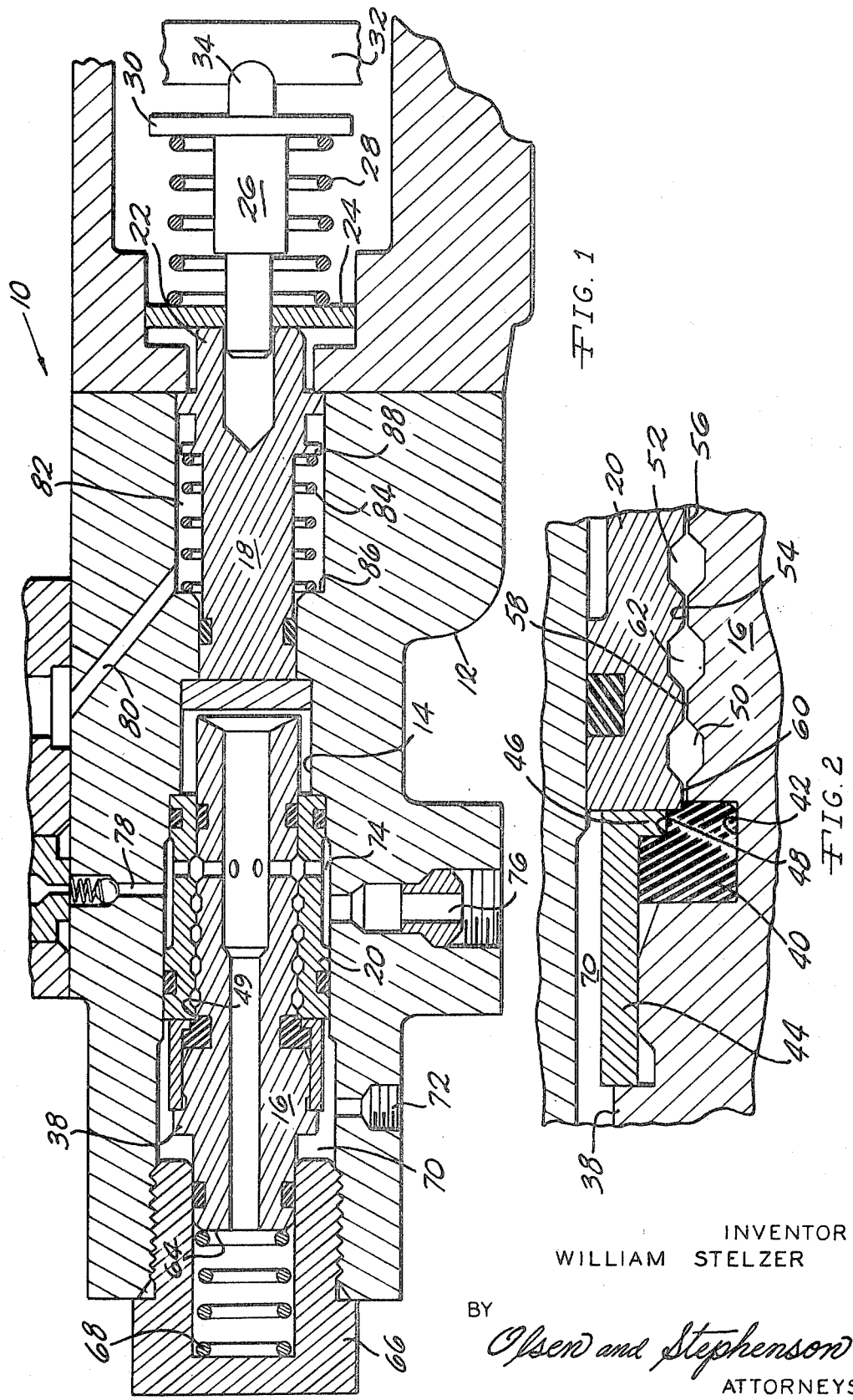

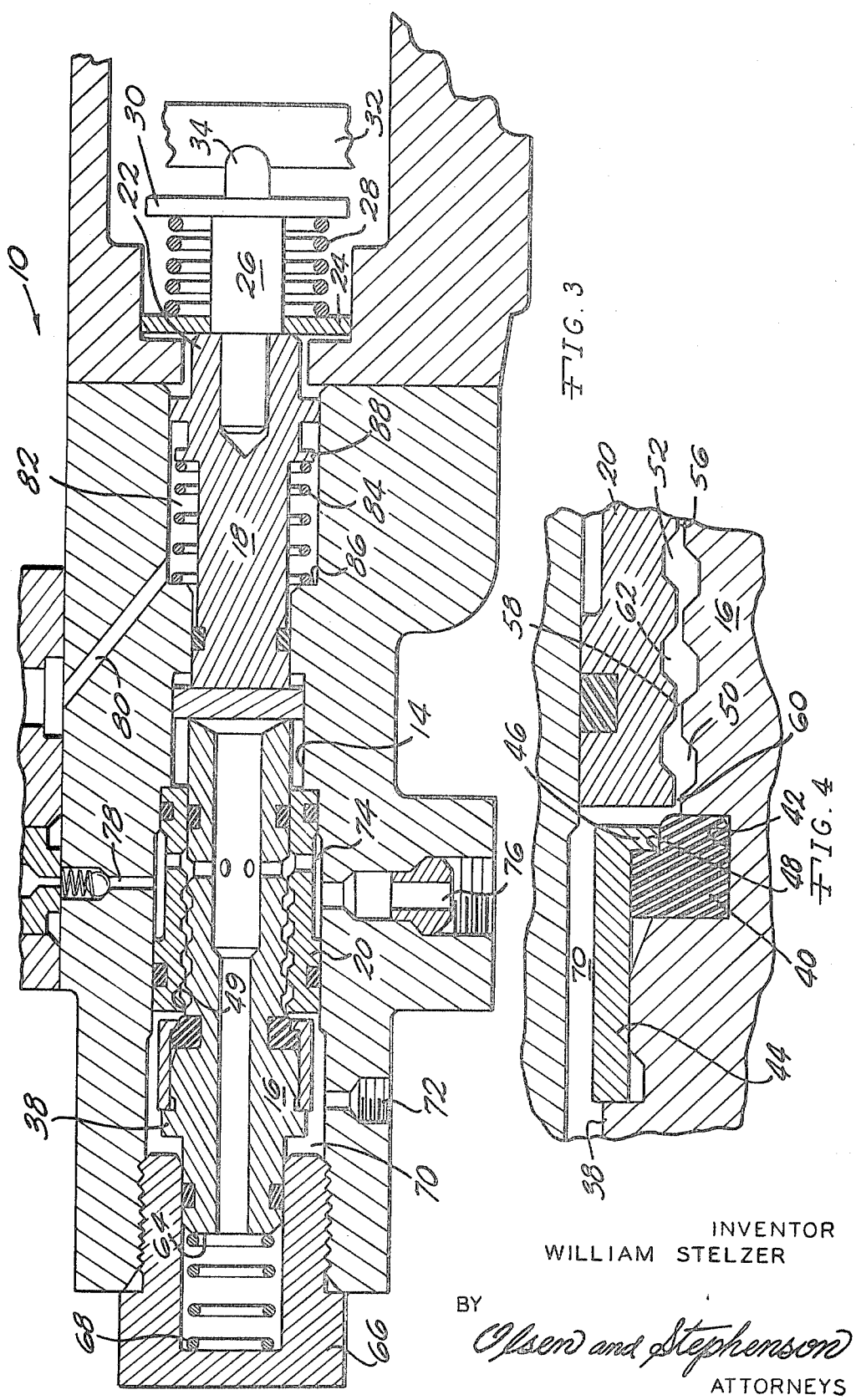

Patented Feb. 29, 1972

INVENTOR
WILLIAM STELZER

BY
Olsen and Stephenson
ATTORNEYS

VALVE FOR FLUID-ACTUATED BRAKE SYSTEM

This invention relates generally to a valve for a fluid-actuated vehicle braking system incorporating skid control, and more particularly to an improved valve in which the problem of valve part erosion due to the action of high-velocity fluid is reduced or eliminated. The valve disclosed herein is an improvement over the valve disclosed in applicant's copending application, Ser. No. 763,088 filed Sept. 27, 1968.

It is an object of the present invention, therefore, to provide an improved valve for fluid-actuating brake systems.

A further object of this invention is to provide an improved valve of the above-described type in which an elongated passage is formed between an inlet chamber containing high-pressure fluid and an outlet chamber, the passage having narrow sections and wider sections arranged in an alternating relation so that in response to relative movement of the parts forming the passage, the effective width of the passage is progressively increased so as to progressively decrease the magnitude of the frictional force of the passage walls on fluid flowing therethrough.

Still another object of the present invention is to provide a valve of the above-described type incorporating a seal for closing the passage which communicates the inlet and outlet chambers and a retaining sleeve which is assembled with the seal so that when the valve is opened, the retaining sleeve peels the seal away from the passage thereby overcoming the force of the high-pressure fluid on the seal.

The aforementioned copending patent application discloses a modular brake system for wheeled vehicles incorporating skid control wherein the braking fluid pressure is relieved, in response to a signal indicating a skid condition, through a main valve that is actuated to apply the brakes. A necessary feature of such a valve is communication of an inlet chamber containing high-pressure fluid with an outlet chamber that supplies fluid to the brake cylinders when the brakes are to be applied. In prior valves, erosion and damage to the valve parts that necessarily are contacted by the high-velocity fluid which flows from the inlet chamber to the outlet chamber when the brakes are applied has been a problem. In the present valve, this problem is reduced or eliminated by the provision of an elongated passage connecting the inlet chamber and the outlet chamber, with this passage having closely spaced wall portions which apply frictional forces to the fluid flowing therethrough so as to prevent the fluid from flowing at high velocity and thereby reduce the eroding effects of the fluid. This passage is formed between a piston and cylinder in the valve by closely spaced surfaces on the piston and cylinder which are provided with spaced-apart matching grooves. The grooves, when the valve is closed, provide sections in the passage which are wider than the narrow passage sections. As the piston is moved axially relative to the cylinder, these grooves are moved out of alignment to progressively widen the passage and reduce the frictional effect of the passage walls on the fluid flowing therethrough when such frictional effect is no longer necessary because the pressure drop between the chambers has decreased. This arrangement eliminates the eroding effects on the valve of a sudden burst of high-pressure fluid, and enables the flow restricting effect of the passage to be reduced, in response to movement of the piston a relatively short distance. In addition, in the valve of this invention the passage is closed, when the brakes are not applied, by a resilient seal ring located in the inlet chamber. The eroding and damaging effects of the high pressure fluid on the seal are reduced by the provision of a retaining sleeve which encircles and thus protects the seal and in addition includes a flange engaged with the seal so that it can apply a pulling force to the seal to peel it away from its position in sealing engagement with the cylinder when the piston is moved so as to open the valve.

Further objects, features and advantages of this invention will become apparent from a consideration of the following description, the appended claims, and the accompanying drawing in which:

FIG. 1 is a fragmentary longitudinal sectional view of the valve of this invention, showing the valve structure in a brake release position;

FIG. 2 is an enlarged fragmentary sectional view of a portion of the valve of this invention, showing in greater detail the relative positions of the valve parts which form the connecting passage between the inlet chamber and the outlet chamber, and the seal for this passage, when the valve parts are in the position shown in FIG. 1;

FIG. 3 is a sectional view of the valve structure of this invention, illustrated similarly to FIG. 1, showing the valve structure in the position when the brakes are initially applied;

FIG. 4 is an enlarged fragmentary sectional view of a portion of the valve of this invention, showing in greater detail the relative positions of the valve parts which form the connecting passage between the inlet chamber and the outlet chamber, and the seal for this passage, when the valve parts are in the position shown in FIG. 3;

Figures 5, 6:
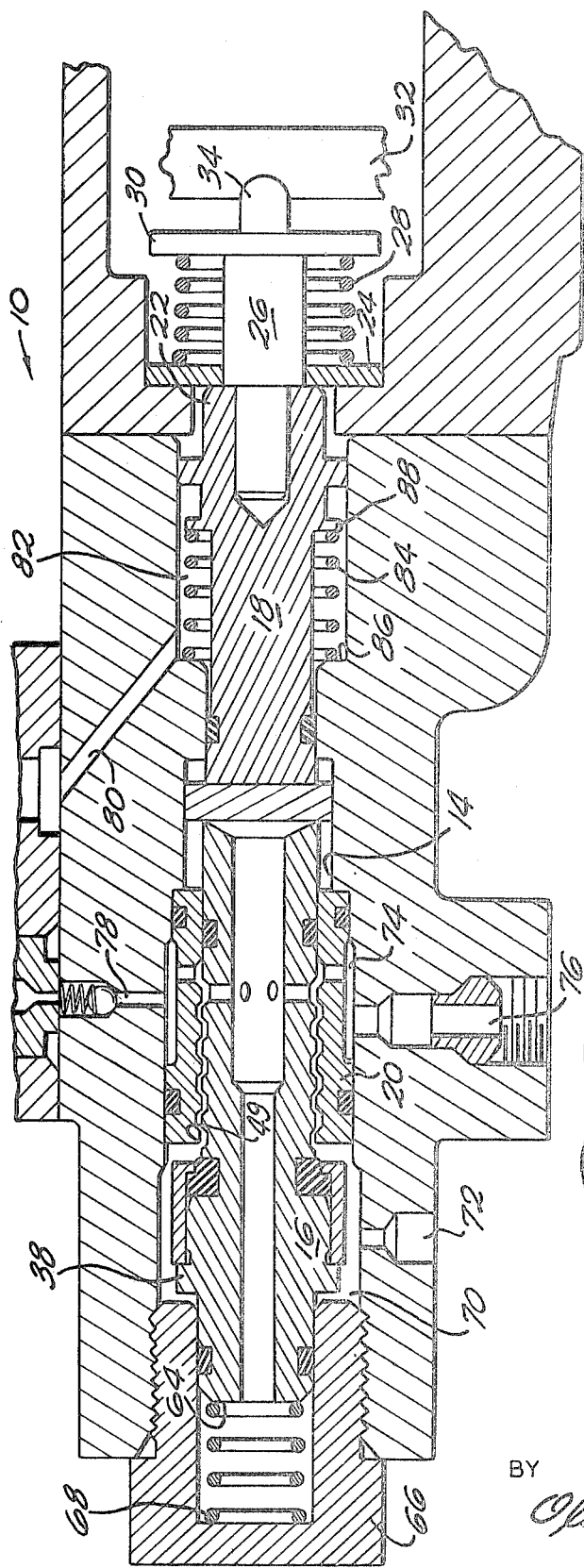

FIG. 5 is a sectional view of the valve structure of this invention, illustrated similarly to FIGS. 1 and 3, showing the valve structure in position corresponding to a fully applied condition of the brakes; and FIG. 6 is an enlarged fragmentary sectional view of a portion of the valve of this invention, showing in greater detail the relative positions of the valve parts which form the connecting passage between the inlet chamber and the outlet chamber, and the seal for this passage, when the valve parts are in the position shown in FIG. 5.

With reference to the drawing, the valve of this invention, indicated generally at 10, is illustrated in FIG. 1 as including a housing 12 having an axial bore 14 in which a pair of pistons 16 and 18 are mounted. The piston 16 is slidably supported in a cylinder 20 fixedly mounted in the bore 14 and the piston 18, which is slidably mounted directly in the bore 14, has an extension 22 which engages an abutment plate 24. An actuating plunger 26 is slidably mounted in the piston 18 and a compression spring 28 extends between a flange 30 on the plunger 26 and the abutment plate 24 so that the spring 28 acts to urge the piston 18 and the plunger 26 in directions away from each other. Other structure (not shown) limits the movement of plunger 26 away from the piston 18 to the position shown in FIG. 1.

A brake-actuating bar 32 has an extension 34 which engages the flange 30, and the brakes are applied by manually moving the bar 32 in a direction toward the piston 18. Thus, in the valve 10 of this invention, the brakes are applied by depressing the bar 32 so as to move the pistons 16 and 18 in a direction toward the left as viewed in FIG. 1. The brake system for which the valve 10 is particularly intended is described in detail in the aforementioned copending application. Further detailed description of the system in the present application is omitted for purposes of clarity as it is not necessary for a full understanding of the present invention and is therefore incorporated herein only by reference.

The piston 16 is provided intermediate its ends with a radially extending flange 38 and a ring shape seal member 40, formed of a suitable resilient material such as rubber, is positioned in a circumferential groove 42 in the piston 16 at a position spaced from the flange 38. A retaining sleeve 44 is press fit on the piston 16 to a position in which the sleeve 44 abuts the flange 38, in which position the sleeve 44 substantially encircles the seal member 40. A radially inwardly extending flange 46 on the sleeve 44 projects into a corner groove 48 formed in the seal 40 and engages the seal 40 for a purpose to appear presently. As best appears in FIG. 2, the retainer sleeve 44 is positioned so that a portion of the seal 40 is capable of sealingly engaging the inner edge 49 at one end of the cylinder 20.

At a position adjacent the seal 40, the piston 16 if formed with a plurality of spaced annular grooves 50 and similar grooves 52 are formed in the inner surface of the cylinder 20 so that the grooves 52 are substantially radially aligned with and match the grooves 50 when the piston 16 is in the position shown in FIGS. 1 and 2. The outer wall 54 of the piston 16 is of a size such that it is closely spaced from the inner wall 56 of the cylinder 20, as shown in FIG. 2, and as a result, a passage 58 is formed between the piston 16 and the cylinder 20 for a purpose to appear presently. The passage 58, when the piston 16 is in the position shown in FIGS. 1 and 2 has narrow sections 60 located between the grooves 50 and 52 and wider sections 62 at the grooves 50 and 52.

The end 64 of the piston 16 which is remote from the piston 18 is slidably supported in a plug 66 secured to the housing 12, and a compression spring 68 extends between the piston end 64 and the plug 66 so that the piston 16 is continually urged toward the right as viewed in FIG. 2. Between the cylinder 20 and the plug 66, an inlet chamber 70 is formed in the housing 12, and the chamber 70 communicates through a passage 72 with a suitable supply of fluid under pressure. An outlet chamber 74 formed in the housing 12 by an annular space between the cylinder 20 and the housing 12 communicates through an outlet passage 76 with the wheel brake cylinders (not shown). The outlet chamber 74 also communicates through passages 78 and 80 in the housing 12 with a brake release chamber 82 in a manner and for a purpose explained in detail in the aforementioned copending application. A spring 84 in the brake release chamber 82 extends between a housing shoulder 86 and a flange 88 on the piston 18 so as to urge the piston 18 toward the right as viewed in FIG. 1.

In the operation of the valve 10 of this invention, assume that the valve is in the brake release position illustrated in FIG. 1 in which the seal 40 engages the cylinder 20 so as to block communication between the inlet chamber 70, which contains high-pressure fluid, and the outlet chamber 74. Now assume that the brakes are to be applied, and as a result the plunger 26 is depressed, namely, moved toward the left, to the position shown in FIG. 3 in which the springs 28, 68 and 84 are compressed, the piston 18 has engaged the piston 16 and moved it toward the left a distance sufficient to move the seal 40 out of engagement with the cylinder 20, as shown in FIG. 4. This movement of the seal 40 to a position disengaged from the cylinder 20 enables high-pressure fluid to flow into the connecting passage 58 which extends between the inlet chamber 70 and the outlet chamber 74. Movement of the seal 40 to this position is facilitated by the provision of the flange 46 on the retaining sleeve 44 which exerts a pulling force on the seal 40 during movement of the seal from its FIG. 2 to its FIG. 4 position. This pulling force effectively peels the seal 40 off the cylinder 20 against the action of the high-pressure fluid in the chamber 70 on the seal 40. Furthermore, during flow of fluid from the chamber 70 into the passage 58, the retaining sleeve 44 acts to protect major portions of the seal 40 against contact with the fluid.

During flow of fluid through the passage 58, the passage walls 54 and 56 apply frictional forces to the fluid which tend to reduce the fluid velocity and thereby reduce the undesirable eroding effect of the fluid caused by the high velocity of the fluid and provide smoother modulation. The closely spaced passage walls in the passage sections 60 have a much greater frictional effect on the fluid than do the passage walls at the grooves 50 and 52 since the walls in the section 60 act on a much smaller mass of fluid. It is to be importantly noted that when the piston 16 is moved from its FIG. 2 to its FIG. 4 position, the lengths of the narrow passage section 60 are decreased, and this decrease has taken place continually during movement of the piston 16 between these two positions. This decrease in length continues to take place until the piston 16 has been moved to its position shown in FIGS. 5 and 6 in which the brakes are fully applied. In such position, the lengths of the passage sections 60 have been reduced to zero and the passage 58 has been formed into one of substantially sinuous shape, as shown in FIG. 6. Fluid can then flow freely through the passage 58 from the inlet chamber 70 to the outlet chamber 74.

It can thus be seen that during movement of the piston 16 from its brake release position shown in FIG. 1 to its brake applied position shown in FIG. 5, the width of the connecting passage 58 has been progressively increased so that the flow of fluid between the chambers has been allowed to take place at a gradually increasing flow rate, rather than at a sudden high velocity. When the plunger 26 is released so that the piston 16 is returned to its FIG. 1 position the passage 58 is gradually restricted to shut off the flow from chamber 70 to chamber 74.

From the above description it is seen that this invention provides an improved valve 10 in which the velocity restricting effect of the connecting passage 58 between the inlet chamber 70 and the outlet chamber 74 reduces the eroding effect of high-velocity fluid on the valve parts. By virtue of the configuration of the passage walls 54 and 56 with narrow sections 60 and wider sections 62 arranged in an alternating relation the desired gradual reduction in the velocity retarding effect of the passage 58 is obtained by a relatively small movement of the piston 16, thereby making rapid brake application or fine modulation possible.

What is claimed is:

1. In a valve having first and second separated chambers which are selectively communicatable and wherein said first chamber is for high-pressure fluid which is to flow into said second chamber, a pair of relatively movable members forming an elongated passage of nonuniform cross-sectional area extending between said chambers and having closely spaced wall means and wider spaced wall means which are spaced apart in all relatively moved positions thereof and which closely spaced wall means will apply frictional forces to fluid flowing through said passage sufficiently to reduce the velocity of said fluid, a seal member carried by one of said members and engageable with the other one of said members at one end of said passage for closing the passage and said closely spaced wall means and said wider spaced wall means forming an elongated passage of substantially uniform cross-sectional area when the valve is fully open.

2. The structure according to claim 1 wherein said relatively movable members are a cylinder and a piston and said passage is formed by grooves in the adjacent surfaces of said cylinder and piston.

3. The structure according to claim 2 wherein said seal member is mounted on said piston and located in said first chamber and further including a retainer sleeve on said piston extending about said seal member.

4. The structure according to claim 3 wherein said retainer sleeve has a radially inwardly directed flange engaged with said seal and capable of applying a pulling force thereto on movement of said piston relative to said cylinder so as to open said passage.

5. A valve for a vehicle brake system, said valve comprising a hollow housing, relatively moveable piston and cylinder means in said housing defining therewith an inlet chamber for supply fluid under pressure and an outlet chamber for braking fluid, said cylinder means extending about said piston means and cooperating therewith to form an elongated passage extending between said inlet and outlet chambers in all relatively moved positions of said piston and cylinder means, seal means on said piston means engaged with said cylinder means in one position of said piston means so as to close said passage, said passage being shaped so that in said one position of said piston means said passage has narrow sections and wider sections of predetermined lengths arranged in an alternating relation, said narrow section applying sufficient frictional force to the fluid flowing therethrough to reduce the velocity of said fluid and means extending into said housing and operable to move said piston means in a direction away from said one position, said piston means being operable in response to movement in said direction to disengage said seal means from said cylinder means to communicate said inlet and outlet chambers and progressively decrease the lengths of said narrow passage sections and increase the lengths of said wider sections whereby said frictional forces are proportionately reduced and movement of said piston means to open the valve fully results in all of said passage sections being substantially the same width.

6. A valve according to claim 5 wherein said passage is formed by coacting grooved surfaces on said piston and cylinder means arranged in a closely spaced relation, said surfaces having spaced grooves formed therein which are in substantial radial alignment in said one position of said piston means.

7. A valve according to claim 6 wherein said grooves are of substantially equal size.

8. A valve according to claim 5 wherein said seal means is a ring-shape body of resilient material extending about said piston means and located in said inlet chamber at one end of said passage, and further including a retainer ring extending about said body so as to clamp said body between said ring and said piston means.

9. A valve according to claim 8 wherein said ring has a flange engaged with said seal body and operable on movement of said piston means in said one direction to apply a pulling force on said seal body directed away from said passage.

* * * * *